(12) United States Patent
Jantunen et al.

(10) Patent No.: US 7,254,484 B2
(45) Date of Patent: Aug. 7, 2007

(54) DETECTION OF LIGHTNING

(75) Inventors: Joni Jantunen, Helsinki (FI); Terho Kaikuranta, Piispanristi (FI); Kari Kalliojärvi, Kangasala (FI); Jakke Mäkelä, Turku (FI); Asko Rintamäki, Tampere (FI); Jukka Reunamäki, Tampere (FI); Arttu Uusitalo, Ruutana (FI)

(73) Assignee: Nokia Corporation, Espoo (FI)

( * ) Notice: Subject to any disclaimer, the term of this patent is extended or adjusted under 35 U.S.C. 154(b) by 47 days.

(21) Appl. No.: 11/251,258

(22) Filed: Oct. 14, 2005

(65) Prior Publication Data

US 2007/0088504 A1    Apr. 19, 2007

(51) Int. Cl.
*G01W 1/00*    (2006.01)
(52) U.S. Cl. .......................................................... 702/4
(58) Field of Classification Search .................... 702/4;
340/601
See application file for complete search history.

(56) References Cited

U.S. PATENT DOCUMENTS

| 5,263,368 | A | 11/1993 | Breitmeier et al. ....... 73/170.24 |
| 5,537,318 | A | 7/1996 | Moses et al. ................ 364/420 |
| 5,541,501 | A | 7/1996 | Shaver et al. .................. 324/72 |
| 6,232,882 | B1 | 5/2001 | Hed et al. .................... 340/601 |
| 6,625,399 | B1* | 9/2003 | Davis .......................... 396/263 |
| 2005/0197070 | A1 | 9/2005 | Kaikuranta et al. ...... 455/67.13 |
| 2005/0258971 | A1* | 11/2005 | Greenstein et al. ......... 340/601 |

* cited by examiner

*Primary Examiner*—Donald E. McElheny, Jr.
(74) *Attorney, Agent, or Firm*—Harrington & Smith, PC

(57) ABSTRACT

A lightning detector for lightning detection and a lightning detection method, wherein the mobile lightning detector is provided with an antenna, an amplifier front-end, an A/D converter and a digital signal processor, and wherein the lightning detector is a mobile RF device provided with an audio codec whereby the preamplifier of the codec is used for amplification of the detected lightning signal, the A/D converter of the codec is used for the A/D conversion of the amplified lightning signal, and whereby the digital audio processing unit of the codec is used for the signal processing of the lightning detection.

26 Claims, 3 Drawing Sheets

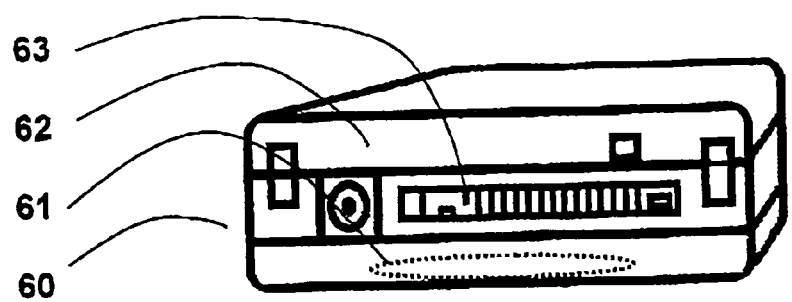
Fig. 6
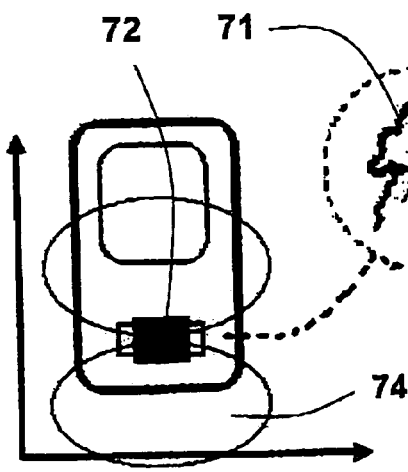 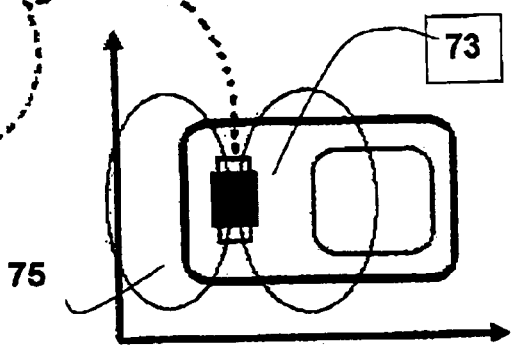
Fig. 7a    Fig. 7b
Fig. 7
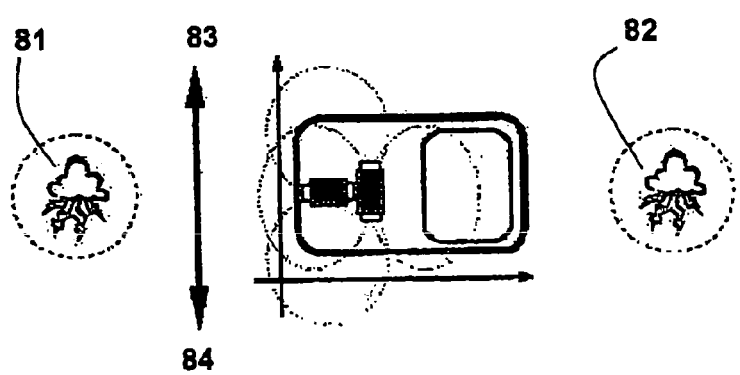
Fig. 8

DETECTION OF LIGHTNING

FIELD OF THE INVENTION

The invention relates to a lightning detector. The invention relates especially to a mobile lightning detector provided with an antenna, an amplifier front-end, an A/D converter and a digital signal processor. The invention also relates to a method for detecting lightning.

BACKGROUND OF THE INVENTION

Thunderstorms are a major weather hazard, but are difficult to predict. They can travel at speeds of 20 km/h to 40 km/h, and lightning strokes may occur more than 10 km in front of the rain clouds and equally some distance behind the rain clouds. While a lightning stroke is produced by a cloud or a weather front, many of the most dangerous lightning strokes actually occur when no visible clouds are present above as a warning of thunderstorm. Thus, a system that warns of possibility harmful thunderstorms, even if only approximately ten minutes before they become visible, can be considered a major safety feature.

There is a large population that would benefit from such a safety feature. To some persons, it might provide only a nice-to-know everyday knowledge. To a considerable number of persons, however, storm and lightning originated threats have significant implications in the form of an increased risk, loss of property or even fatal consequences. A lightning alerting system is of particular interest, for instance, for persons spending much time outdoors, and equally for aviators, navigators or the like. A system providing a warning of lightning even when the weather seems to be perfectly calm and clear may enable a person to take suitable safety measures in time, for instance seek shelter etc.

From the state of the art, many single-purpose lightning detectors are known, but they have some disadvantages from a commercial perspective.

Scientific lightning detectors, which are used in meteorology, are very large and their range is hundreds of kilometers.

Also other high-end lightning detectors using a single radio frequency (RF) band are large and relatively expensive, compared for instance to mobile phones. Moreover, they are usually required to have a specific orientation, for instance standing on a wall or on a desk stand, in order to gain the required accuracy or directionality. They are thus not well suited for a truly mobile use. These devices typically have further to be vertically positioned and held stable for several minutes before a reliable detection of a thunderstorm libecomes possible.

In addition, there are now existing rather inexpensive lowend lightning detectors which are completely portable in size and which do not require a specific orientation. These detectors, however, are extremely susceptible to electromagnetic compatibility (EMC) emissions and thus tend to cause spurious alarms especially in an urban setting or near highways, etc.

SUMMARY OF THE INVENTION

The present invention proceeds from the consideration that a lightning stroke is a single flash which produces besides a visual signal and a partly audible pressure signal as well a brief but strong electromagnetic pulse extending over a wide variety of wavelengths. Typical electromagnetic pulses caused by a lightning stroke cover the frequencies between 10 Hz and 5 GHz with a peak around 500 Hz, i.e. in the audio frequency range. At a normalized distance of 10 km, the amplitudes of such pulses range from 107 mV/m to 1 mV/m in a bandwidth of 1 kHz. the strongest signal of the electromagnetic pulse is the induced electric field caused by the vertical current in the lightning stroke, and this is the parameter that is most commonly measured in large-scale equipment for detecting lightning bearing and distance.

However, due to the complexity of the lightning stroke phenomenon, there are also strong signals in the extremely low frequency (ELF) range of a few hundred Hz or less, and weaker signals extending up to the GHz range and above.

It is a well-known fact that the exact characteristics and time spectra of the electromagnetic interference (EMI) signatures are different in the MHz range that in the kHz and Hz ranges due to the slightly different meteorological mechanisms causing them.

However, for the purposes of the present invention it is sufficient to note that at all frequencies of interest, a lightning stroke is accompanied by an EMI pulse that can be identified at a distance of many kilometers.

As a result of the EMI pulse, RF channels are briefly interfered during a lightning stroke in the vicinity. The impairment of RF receivers due to an EMI caused by a lightning stroke can be experienced in AM/FM radio, TV or over power supply lines in form of static, clicks, scratches, picture interference or loss of sound, etc. Disturbances in RF channels due to a lightning stroke can be sensed at very large distances. Specialized and large-scale lightning detectors are able to detect lightning disturbances, so-called sferics, at a distance of several hundreds of kilometres from a lightning stroke, although these detectors typically operate by measuring the induced electric field rather than the interferences in an audio or RF signal as the present invention.

Ordinary AM radios are known to suffer from EMI disturbances at a distance up to 30 km or more from a lightning stroke, which can even be heard directly in an audio signal as various clicks. At higher frequencies than AM bands (SW, LW, MW) the signal is typically much weaker due to both atmospheric attenuation and different causation mechanisms, but is nevertheless detectable at large distances.

While in known mobile RF devices, such as ordinary mobile phones, electromagnetic interference in received RF signals are eliminated immediately by filtering or as a result of the employed modulation, it is proposed in the present invention that such electromagnetic interferences in a monitored RF channel are evaluated. If a detected interference seems to be caused by a lightning stroke, a user of for example a mobile phone can be alerted. An interference can be assumed to be caused by a lightning stroke for example if it exceeds a predetermined threshold value or if it has a frequency spectrum which is characteristic of a lightning stroke. The lightning detection can be on as long as the RF detection is on.

The present invention thus provides a new security feature that can be implemented in a mobile RF device, for example a cellular phone.

While in many case, the desire to detect lightning strokes in the vicinity may not be large enough to justify the costs and the difficulty of carrying along a dedicated lightning detector, many people would appreciate a low-cost sensing system that could be integrated with a device that they are already carrying along in any case, especially like a mobile phone. The known art does not provide for such an integration of a lightning detection as a new functionality in known mobile RF devices.

In most known commercial lighting detectors electromagnetic signals from a lightning are detected in a relatively low frequency band, i.e. on audio frequencies compared with RF frequencies. Since audio codecs in mobile RF devices typically amplify the signals by 40 to 60 dB on the bandwidth up to 48 kHz, an audio codec can therefore be used also for amplification and further processing of signals from a lightning detection front-end. The audio codecs also contain high-quality A/D converters which can be used in the lightning detection as well. In addition to amplification and A/D conversion, some parts of the digital audio processing blocks in the codec can be used in signal processing in the lightning detection.

Thus according to the first aspect of the invention, the present invention is based on the use of an audio codec in a mobile RF device as a lightning detector.

For the first aspect of the invention it is therefore proposed that the lightning detector is a mobile RF device provided with an audio codec whereby the preamplifier of the codec is used for amplification of the detected lightning signal, the A/D converter of the codec is used for the A/D conversion of the amplified lightning signal, and whereby the digital audio processing unit of the codec is used for this signal processing of the lightning detection.

In a preferred embodiment of the present invention the lightning detection front-end is connected in parallel with a microphone so that a microphone input of an audio codec is shared by the lightning detection and another application.

In a second preferred embodiment of the present invention a microphone input that otherwise would be unused is used as a lightning detection front-end interface.

According to a further embodiment of the present invention a speech codec of a mobile RF device is utilized in lightning detection, whereby the A/D converted lightning signal is processed in the speech codec path and the symbols detected and output by the speech codec are analysed from the lightning detection point of view using digital signal processing (DSP) methods.

According to a still further embodiment of the present invention the amplification path of an audio codec is used in lightning detection in conjunction with AM and/or FM radio receivers of a mobile RF device.

According to a still further embodiment of the present invention the lightning detection is carried out as a combination of detection on two or more frequency channels.

According to a still further embodiment of the present invention there are at least two microphone inputs available for the lightning detection, and the lightning detection is carried out on two different audio frequency bands.

According to a still further embodiment of the present invention two orthogonally positioned antenna coils are used to implement a detector which can also detect the direction of lightning strikes.

According to a still further embodiment of the present invention the RF device contains means to determine the orientation of the mobile RF device at the time of the lightning strike.

According to a still further embodiment of the present invention detected lightning strike information including the event time is stored in a memory for determination of the probable lightning strike distance from the mobile device.

According to a still further embodiment of the present invention the mobile RF device is able to store in said memory additional meteorologic information received from the network.

According to a still further embodiment of the present invention the meteorological information can be displayed on a display showing the intensity, distance and relative and true directions to thunderstorms.

Characteristic features of the lightning detector and the method of detecting lightning according to the present invention are in detail presented in the enclosed claims.

The present invention allows a creation of an integrated system utilizing existing architectures, modules and signaling processing or computing possibilities in a mobile RF device.

Further, when the amplification path and preferably also other parts of an audio codec in a mobile RF device are used in the lightning detection, the costs and the required space are significantly decreased because no separate hardware is needed for lightning detection.

BRIEF DESCRIPTION OF THE DRAWINGS

In the following, the invention will be described in more detail with reference to the appended drawings, in which:

FIG. 5a presents detection on two different frequencies, FIG. 5b detection and direction estimation by using two orthogonal coils and FIG. 5c omni-directional detection FIG. 6 depicts a proprietary port used in mobile RF terminals, a removable functional cover of a mobile terminal and a battery charging coil used for lightning detection, and/or a RFID coil used for lightning detection, FIG. 7 depicts two orientations of lightning detection antennas, with the antenna vertically orientated in FIG. 7a and horizontally in FIG. 7b, and FIG. 8 depicts schematically an ambiguous front/back detection situation.

DETAILED DESCRIPTION OF THE INVENTION

Figure 1:
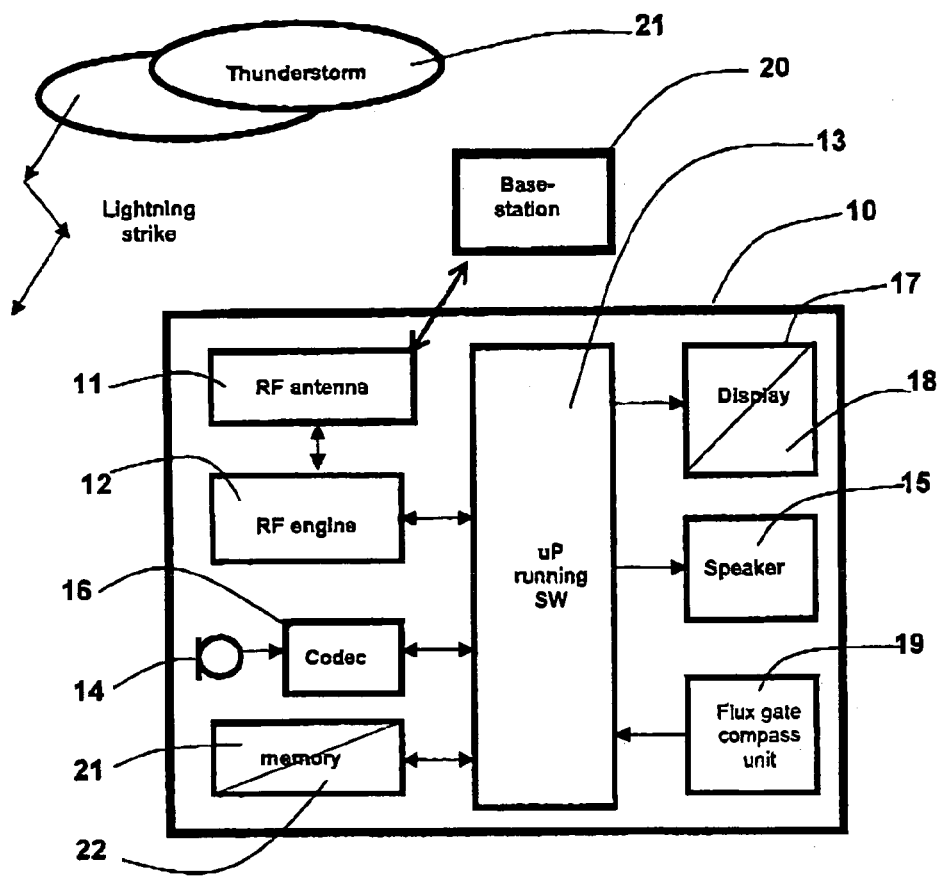
FIG. 1 is a schematic block diagram of a system according to the present invention.

FIG. 1 is a schematic block diagram of a cellular communication system enabling a lightning alert in accordance with the present invention. The system can be for example a GSM system.

The cellular communication system comprises a cellular phone 10 and a base station 20 of a cellular communication network.

The cellular phone 10 comprises a receiving RX antenna 11, which is connected via an RF module 12 to a microprocessor 13. The cellular phone 10 further comprises a microphone 14 and a speaker 15 as well as and an audio codec 16 for forming an audio amplification path, A/D conversion and further digital signal processing of the audio signals. The microprocessor 13 is further connected to a display 17. This display can be partitioned 18 for multiple applications. The cellular phone 10 can additionally comprise an electronic compass 19 and a memory 21 partitioned 22 for multiple applications. In addition, the cellular phone 10 comprises other components not shown but known to be comprised in a conventional cellular phone.

Figure 2:
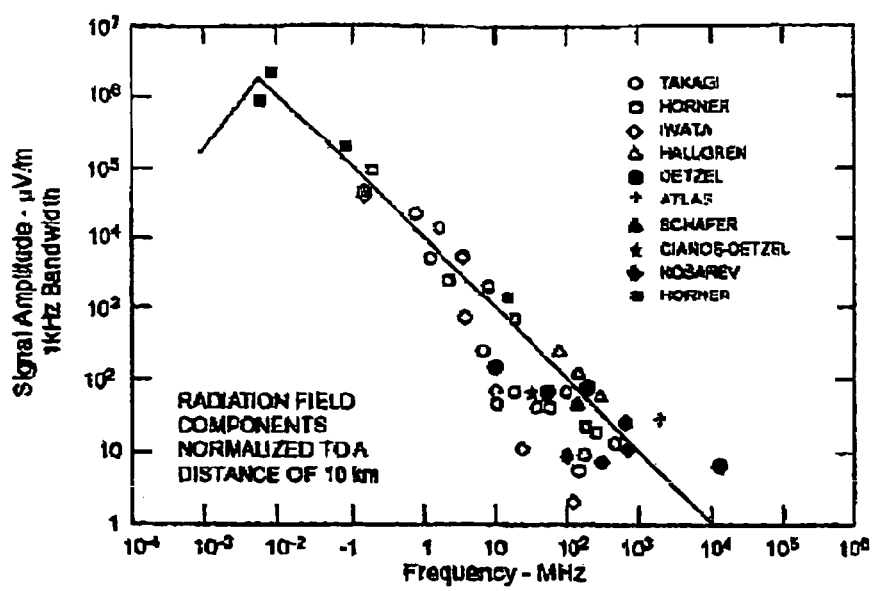
FIG. 2 presents the frequency spectrum of an electromagnetic signal caused by lightning at the distance of 10 km.

As can be seen from FIG. 2, most of the electromagnetic energy emitted by lightning is on frequencies near to 5 to 10 kHz (i.e. audio frequencies). Therefore it is reasonable to carry out lightning detection at relatively low frequencies. However, the man made EMC levels are highest at the same low frequencies but will rapidly attenuate with frequency, so it is advantageous to use a somewhat higher lightning detection frequency or alternatively to first downconvert a higher detection frequency to baseband so that the lightning detection can take place undisturbed from man made EMC.

Figure 3:
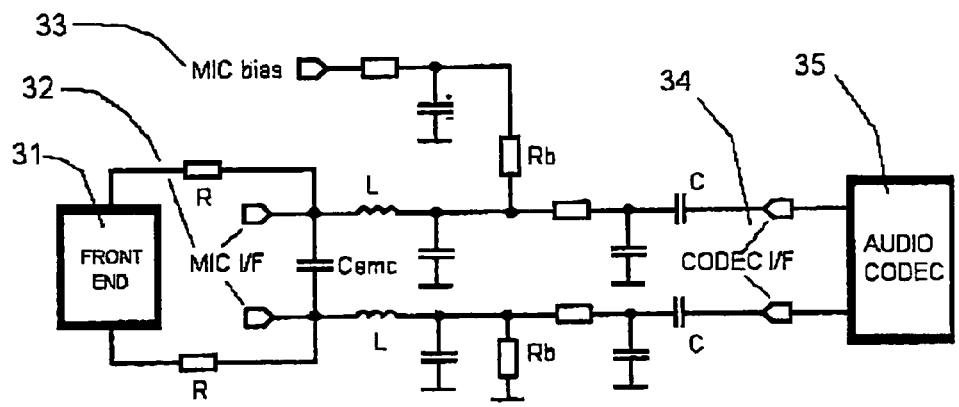
FIG. 3 is an exemplary circuit of a microphone input circuitry whereby the microphone circuitry can be divided by a microphone and a lightning detection front end.

The present invention is based on the use of an audio codec of the mobile phone 10 as the amplification path, for A/D conversion and for digital processing of the lightning signals in the lightning detection. The idea is to connect the antenna (e.g. a coil) or a front-end 31 containing multiple components or frequency converting means required for lightning detection using the input 34 of an audio codec. The lightning detection front-end 31 may be connected in parallel with the microphone so that a microphone input 32 of the audio codec 35 is shared by two applications (see FIG. 3), the lightning detection front-end 31 and the microphone 14.

Alternatively the microphone input that would be otherwise unused, can be dedicated to the lightning detection front-end. Depending on the performance of the audio coded some filtering and amplification may be needed in the lightning detection front-end before the signal can be input to the audio codec in order to achieve sufficient performance characteristics.

The analog lightning detection signal from the front-end is amplified and A/D converted in the audio codec. Audio codecs also contain analog or digital filters. After the A/D conversion and filtering the lightning detection signal can be analyzed using digital signal processing (DSP) methods, and the information about the detected lightning can be presented on the device's user interface (i.e. the display and/or speaker).

An audio codec with one or several microphone inputs can also be utilized by sharing an input by lightning front-end and e.g. headset accessory. Alternatively, the lightning detector front-end accessory might be possible to attach to the same I/O connector (e.g. POP port) that is used for headset and hands-free accessories. Such a proprietary Nokia POP connector is depicted as 63 in FIG. 6. All Nokia POP port attachable accessories may contain a circuitry (ACI chip) where the parameters which are needed for optimised use of the DSP are stored. By using the parameters in ACI the DSP is configured to support better the use of accessory attached to POP port.

Alternatively, the lightning detector front-end accessory might be possible to contain in a user removable functional cover 62 of the portable terminal 60 or embedded with the circuitry used for contactless charging using a battery charging coil 61 or coils 61.

One important issue from the implementation point of view is the implementation of lightning detection antenna on audio frequencies. Traditionally the antenna has been implemented as a separate coil. However, a coil requires quite much area and space, and therefore it is essential to find an effective way to implement the coil/coils in the target device. In the present invention the amplification path of an audio codec could be used also in conjunction with a secondary coil or coils 61 used for inductive battery charging.

Figure 4:
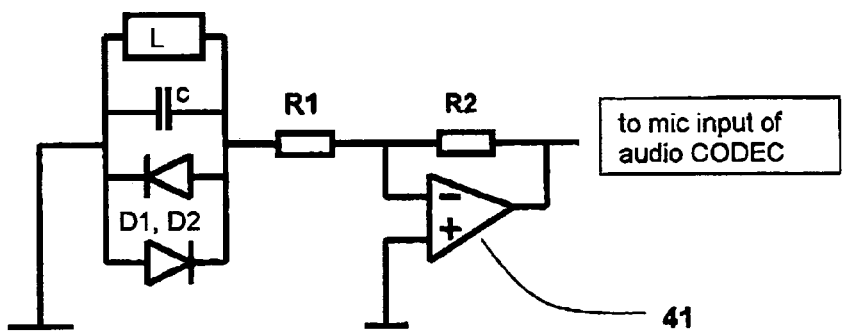
FIG. 4 presents an implementation of a lightning detection front-end at audio frequencies.

Lightning detection front-end can be implemented on audio frequencies for example like presented in FIG. 4. The lightning detection antenna coil L and front-end can be implemented for example with the presented topology. The coil L and capacitor C comprise a band-pass filter and diodes $D_1$ and $D_2$ are needed to protect the gain stage from too large voltage peaks. An optional operational amplifier stage 41 with gain setting resistors R1, R2 may be needed before the signal can be routed to audio codec to achieve sufficient gain in the whole amplification path.

A low-end lightning detector design has typically a gain of 76 dB at the detection frequency band. Because known audio codecs have typically gains of 34 to 59.5 dB, some additional amplification is maybe needed to achieve the sufficient gain on the whole amplification path. However, it may be possible to achieve the sufficient gain for lightning detection on audio frequencies without any additional amplification path of an audio codec.

It may be also possible to utilize speech codec in lightning detection. The A/D converted lightning signal could be processed using the speech codec path and the symbols detected and output by speech codec could be analysed from lightning detection point of view using digital signal processing (DSP) methods. Further a combination of audio circuitry 51, 52 and speech codecs 53 can also be utilized also for analysing the lightning signal. The advantage in using of speech codec in lightning detection would be that speech codec is normally unused for long periods and therefore its utilization rate could be increased.

Alternatively, an amplification path of an audio codec could be used lightning detection also in conjunction with AM or FM radio receivers. Although it is said above that the present invention is based on detection on audio frequencies, the detection is possible also on higher frequencies like AM (150 kHz-30 MHz) and FM (87.5-108 MHz) radio frequencies by down-converting these high-frequency signals to audio frequencies with a down-converter. The best result may be achieved as a combination of detection on two or more frequency channels sufficiently far from each other. Some detection and distance measurement methods are based on different attenuation of the lightning noise on different frequencies, and therefore the combination of two or more receivers gives a better estimation about the distance to lightning activity in thunderstorms.

Further, it is possible to detect a signal from lightning by using AM or FM radio receiver front-end and by amplifying the signal using an audio codec coding (TX) path as a part of the detection chain and either using the produced codes as input for digital signal processing (DSP) methods or using the decoding (RX) path of the same codec for this purpose, in order to detect and classify lightning signals.

Figure 5:
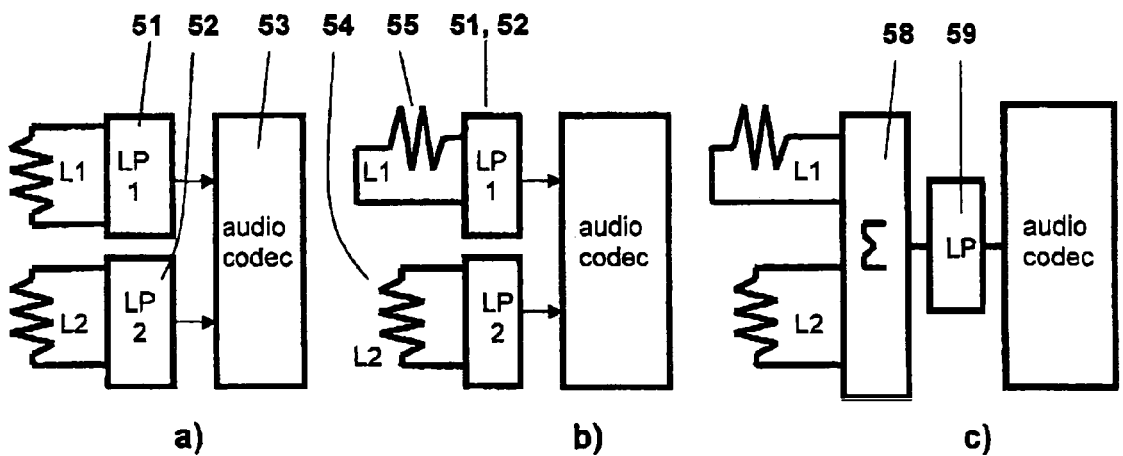
FIGS. 5a to 5c present implementations how two lightning detection antenna coils can be used.

If more than one microphone inputs are available, the lightning detection may be done on two different audio frequency bands which makes the detection and analysis more accurate. See FIG. 5a for the implementation principle. Two orthogonally positioned antenna coils 54, 55 can be used to implement a detector which can also detect the direction of lightning strikes (see FIG. 5b). The direction detection is based on the comparison of the levels received from orthogonal coils. In addition, two coils can be used to achieve an omni-directional lightning detector (see FIG. 5.) The omni-directional detector can be implemented by using separated channels for the signals from the coils L1 and L2 54, 55 like in FIG. 5b or the signals from two coils can be summed 58 and analysed as one signal after possible filtering in filter 59 like in FIG. 5c. Of course, the summed signal from the summer 56 does not give any information about the direction of lightning strikes. Even when using orthogonal coils as depicted in FIG. 8, the determination of direction is ambiguous. It is not possible to determine without additional antennas if a signal is received from the front 81 or from the back 82 direction. However, by combining meteorologic information received from the network or by simply asking the user to input wind direction, this ambiguity can be resolved. One coil or both coils in FIGS. 5a to 5c may also be inductive charging coils, like the charging coil 61 in FIG. 6, or can be coils that are used for some other purpose, like for example used for RFID purposes.

The audio codec used in the present invention may be of a type that are generally used in mobile RF devices and are available in the common market. Such audio codecs are e.g. UEME having a microphone input stage consisting of inputs for three signals, a 3/1 multiplexer and a differential microphone amplifier and Texas Instruments TLV320AIC23B which is a stereo audio codec with an integrated headphone amplifier.

The invention may contain ideas for the improvement of measurement performance and current consumption of the device by utilizing the orientation of detector device. See FIG. 7, where both a horizontal 72 and a vertical 73 orientation of the detection antenna is depicted.

Since the antenna gain of loop antennas varies significantly as a function of the angular position to RF source 71 the orientation of the detectors can be used to improve detection, ranging and/or direction measurement performance.

In essentially all known lightning detection devices that rely on detection of magnetic component (H) of electromagnetic field, there are one coil or two orthogonal coils which are used to receive RF signal emitted by lightning strokes. Since the radiation from lightning strokes is most intensive on frequencies below 50 MHz basically the only reception antenna alternative that can be integrated into mobile devices is a small loop-antenna.

One central property of coil antennas is the directivity pattern. The pattern looks like a donut 74, 75 whose axis is parallel with the axis of ferrite core 76. If only one detection antenna is used the detection situation is similar to the situation presented in FIG. 7. Variation in angular position to the detected stroke causes variation of 10-30 dB to the induced signal. This variation occurs when the axis of coil remains horizontal. If the axis is oriented vertically, the induced signal may be even smaller than 30 dB in comparison with the optimal orientation.

If only one coil antenna is used the main difficulty in estimation of distance (and detection itself as well) is the varying antenna gain depending on the receiving direction of emission. In theory, depending on the receiving angle the gain may vary from 0 dB (angle is 0° or 180°) to e.g. −30 dB (angle 90° or 270°) when RF emission from lightning is received. If the antenna gain varies significantly (between two consecutive measurements) and no position information exists, it is very difficult to find out (by using only one coil antenna) if the amplitude variation depends on the radial distance change between storm and detector, or is the amplitude variation caused by the angular change of the detector causing variation in antenna gain.

This embodiment describes a handheld device with at least one magnetic coil and some method of determining the orientation of the device. The latter method may also be manual (the user is required to orient the device). The combination is used to provided a better distance estimate to the lightning source (and possibly also enable direction-finding).

When the orientation is known, the directivity problem of coils can be solved or at least minimized. Also, rapid changes in orientation can be used to detect a state in which an accurate measurement is not possible.

The idea of this invention is to utilize the position, orientation and/or movement information of lightning detector device to compensate non-idealities of the antenna used to detect RF emission from lightning strokes. Since the RF emission from lightning strokes is mostly vertically polarized and most intensive on low frequencies (below 100 MHz), small loop antennas are the most space-effective solution to be used in reception of low frequency RF pulses. High directivity is one typical characteristic of small loop antennas and therefore level of received signal varies heavily depending on the antenna's orientation to the source.

If an appropriate or optimal detection position for the lightning detector can be defined and some other orientations are highly impractical, then it's not rational to detect lightning strokes when the device is heavily moving (i.e. antenna gain is varying fast) or the orientation of the device is not suitable for the detection (i.e. antenna gain is small). For example, in these circumstances the lightning detector can be switched off to save power and detection can be continued after the device is held still or in a more optimal orientation from lightning detection point of view.

In practice, it is not essential how the orientation information of the device is identified. The easiest ways may be to measure the orientation by using magnetometer or accelerometer sensors, which will be integrated to the mobile detector in the same way as the fluxgate compass 19 in FIG. 1. For practical use this compass should be tilt compensated in order to allow the use in a plane differing from the horizontal plane without loss of directional accuracy. Another feasible alternative is to get an indication from the user interface as input from the user, how the device is orientated from the lightning detection point of view, and also in order to correlate with meteorologic information received from the network, when such additional information is available.

The basic idea of this embodiment can be utilized in many individual embodiments and the following embodiments describe different detection principles. The list begins with the simplest implementation examples and more complex combinations are listed at the end of the embodiment list. The characteristics typical for small loop antennas are valid in all embodiments and information from sensors or other sources (i.e. from the user) indicating device's orientation or position is used in various ways.

In the simplest possible embodiment, orientation and/or motion detectors are used to determine if the device is stationary. Measurements are only performed if the device is stationary, since the gain is then constant.

The simplest implementation of the invention utilizes only the information if the detector is staying stationary or not. Since the radiation pattern of coil antenna is directional, then the detection environment cannot be considered constant if the device is moving. If e.g. the implementation of simple lightning detection algorithms necessitates that the device is stationary, like in some commercial lightning indicators, where indication about the movement of the detector device is needed.

If the detector is moving and there is uncertainty in the detection accuracy the detection feature can be switched off. Another alternative is to stay in triggering mode where only lightning-like pulses are detected and the distance, for example, is done is static conditions.

If one or two coil antennas are used in the reception of the RF emission from a lightning stroke, an optimal position from detection point of view can be defined. The optimal orientation can be the orientation where axes of the coil antennas are horizontal. This means that since the most intensive radiation is vertically polarized it is not worth measuring or detecting the lightning strokes if the axis of antenna coil is nearly vertical, and coupling between lightning stroke channel and antenna coil is small (or coupling from lightning stroke channel originates from horizontal channel components which are more inconsistent than vertical ones).

In a practical case, this means for example that a 2D device (i.e. detector containing only one coil) is disabled when the device is held in a pocket/bag on its side (in which case there is a zero in the direction in which the main signal arrives).

In a more advanced implementation (i.e. including two orthogonal coils with two individual reception channels) one of the channels can be switched off if the detection orientation is impractical.

As already presented in FIG. 7b, the orientation where the axis of coil antenna is vertical is not the most useful from lightning detection point of view. The channel of lightning strokes is usually vertical and therefore RF emission from lightning strokes can be regarded mainly as vertically polarized. If the axis of coil antenna is not horizontal the coupled signal strength can be compensated by using an angle.

With a mobile device with a user interface, it is possible to advise the user to move and orient the device optimally. The optimal orientation is one in which the interference is minimal. This assumes that there is a localized source of interference (such as a fluorescent light). In other words, the detector device is positioned so that the interference source is in the direction which is parallel to coil axis.

The user can be advised to hold the detector in two orthogonal positions if more accurate distance estimation is desired. This in effect creates a "virtual orthogonal coil pair" using just one coil. In one-coil implementation the distance is estimated e.g. from two consecutive lightning strokes, in two different positions.

The measurement situation is similar to the one described in FIG. 7 The detector device is advised to be held in two orthogonal orientations, depicted in FIG. 7a and FIG. 7b. The algorithm needed to measure distance to consecutive strokes accurately enough may require several detected strokes in both orientations. The user can be advised according to the estimation and detection algorithms to reorient his device.

If lightning detector utilizes two (or even three) orthogonal coils as reception antennas the direction information to lightning strokes might be available. However, the direction measurement to the storm by using only two orthogonal coils leaves uncertainty of 180° if only the relation of coupled signals from orthogonal coils is used (see FIG. 7, the detected signal is similar if the lightning stroke occurs in location 81 or 82). By using three coils the direction information may be available.

If the detector is capable of defining direction information to lightning strokes or storm centre, then the orientation information of the detection can be used to collect device's orientation data during consecutive measurements and direction to lightning strokes can be given more accurately.

One suggestion to overcome the uncertainty of 180° in defining direction to lightning strokes is that in many cases it is already a sufficient information if the directions (83 and 84 where lightning strokes are not occurring, can be defined. Another alternative is to input the wind direction. In either case the user can most probably avoid the approaching storm or get more time to find a shelter, if he/she moves to directions 83 or 84. The direction estimate can be of course updated later when the storm approaches or departs.

One embodiment uses two modes: a triggering mode which is launched whenever any interference is noted (at least interference that could be lightning-related). The triggering mode then launches a real sensing mode and optionally changes the display mode, if desired. The user is notified to orientate the device correctly (for example flat on a table). Distance estimation is only made when this orientation is correct.

If user is assumed to be in more or less constant motion, then the angle covers all possible angles and the gain parameter is eliminated. This requires a fairly long time for a good statistical estimate. A simpler version of this is to make the user rotate the device on a table a few times so that most angles are covered. In particular, having the user keep the device at one orientation for a while and then changing it by 90 degrees allows the minimum and maximum gains to be covered.

Finally, the front-end may be integrated to the mobile RF device but it may also be a separate indicator device or it may even be integrated outside the RF device, for example in a so-called functional cover 62 as shown in FIG. 6 Such user changeable functional covers containing a lightning detection front end 31 can be sold as an accessory.

It is obvious to the person skilled in the art that different embodiments of the invention are not limited to the example described above, but that they may be varied within the scope of the enclosed claims.

The invention claimed is:

1. A mobile lightning detector provided with an antenna, an amplifier front-end, an A/D converter and a digital signal processor, characterised in the lightning detector is a mobile RF device provided with an audio codec whereby the preamplifier of the codec is used for amplification of the detected lightning signal, the A/D converter of the codec is used for the A/D conversion of the amplified lightning signal, and whereby the digital audio processing unit of the codec is used for the signal processing of the lightning detection.

2. A mobile lightning detector according to claim 1, characterised in that the lightning detection front-end is connected in parallel with a microphone so that a microphone input of an audio codec is shared by the lightning detection and another application.

3. A mobile lightning detector according to claim 1, characterised in that a microphone input that otherwise would be unused is used as a lightning detection front-end interface.

4. A mobile lightning detector according to claim 1, characterised in that a speech codec of a mobile RF device is utilized in lightning detection, whereby the A/D converted lightning signal is processed with the speech codec path and the symbols detected and output by the speech codec are analysed from the lightning detection point of view in the DSP.

5. A mobile lightning detector according to claim 1, characterised in that the amplification path of an audio codec is used in lightning detection in conjunction with AM and/or FM radio receivers of a mobile RF device, whereby these high-frequency signals are down-converted to audio frequencies with a down-converter.

6. A mobile lightning detector according to claim 1, characterised in that there are at least two microphone inputs available for the lightning detection, and the lightning detection is carried out at least on two different audio frequency bands.

7. A mobile lightning detector according to claim 6, characterised in that in addition, two coils can be used to achieve an omni-directional lightning detector, whereby the omni-directional detector can be implemented by using separated channels or the signals from two coils can be summed and analysed as one signal.

8. A mobile lightning detector according to claim 1, characterised in that the lightning detection is carried out as a combination of detection on two or more frequency channels.

9. A mobile lightning detector according to claim 1, characterised in that two orthogonally positioned antenna coils are used to implement a detector which can also detect the direction of lightning strikes.

10. A mobile lightning detector according to claim 1, characterised in that the RF device contains means to determine the orientation of the mobile RF device.

11. A mobile lightning detector according to claim 1, characterised in that the front-end is integrated to the mobile RF device.

12. A mobile lightning detector according to claim 1, characterised in that the front-end is a separate indicator device or integrated outside the RF device, for example in a so-called functional cover.

13. A mobile lightning detector according to claim 1, characterised in that at least one indicator coil is an inductive charging coils or coil that is used for some other purpose.

14. A method for lightning detection with a mobile lightning detector provided with an antenna, an amplifier front-end, an A/D converter and a digital signal processor, where the mobile lightning detector is a mobile RF device provided with an audio codec having the A/D converter and the digital signal processor having a digital audio processing unit, the method comprising:
   a preamplifier of the audio codec amplifying the detected lightning signal,
   the A/D converter of the audio codec performing an A/D conversion of the lightning signal, and
   the digital audio processing unit of the audio codec performing signal processing of the lightning detection,
   characterised in that the front end is connected in parallel with a microphone input so that a microphone input of an audio codec is shared by the lightning detection and another application.

15. A method according to claim 14, characterised in that the amplification path of the audio codec is used in lightning detection in conjunction with an AM and/or FM radio receivers of the mobile RF device whereby high-frequency signals received by the AM and/or FM radio receiver are down-converted to audio frequencies with a down-converter.

16. A method according to claim 14, characterised in that there are at least two microphone inputs available for the lightning detection, and the lightning detection is carried out at least on two different audio frequency bands.

17. A method according to claim 16, characterised in that in addition, two coils can be used to achieve an omni-directional lightning detector, whereby the omni-directional detector can be implemented by using separated channels or the signals from two coils can be summed and analysed as one signal.

18. A method according to claim 14, characterised in that the lightning detection is carried out as a combination of detection on two or more frequency channels.

19. A method according to claim 14, characterised in that two orthogonally positioned antenna coils are used to implement the detector which can also detect the direction of lightning strikes.

20. A method according to claim 14, characterised in that orientation and/or motion detectors are used to determine if the device is stationary, and that the measurements are only performed if the device is stationary.

21. A method according to claim 14, characterised in that detected lightning strike information including event time is stored in a memory for determination of the probable lightning strike distance from the mobile device.

22. A method according to claim 14, characterised in that the mobile RF device is able to store in a memory additional meteorologic information received from the network.

23. A method according to claim 22, characterised in that the meteorological information can be displayed on a display showing the intensity, distance and relative and true directions to thunderstorms.

24. A method according to claim 14, characterised in that the microphone that otherwise would be unused, is used as a lightning detection front-end interface.

25. A method according to claim 14, where the microphone input of the audio codec of the mobile RF device is utilized in lightning detection and the A/D converter of the audio codec converts the lightning signal to be processed by the digital audio processing unit of the audio codec characterised in that the converted lightning signal is processed and analyzed in the digital audio path of the audio codec in order to detect lightning activity.

26. A method according to claim 25, characterised in that symbols representing detected lightning activity is output to the processor of the mobile RF device by the audio codec.

* * * * *